United States Patent
Kim et al.

(10) Patent No.: US 7,730,807 B2
(45) Date of Patent: Jun. 8, 2010

(54) TRANSMISSION FOR TRACTOR

(75) Inventors: Hyo-jung Kim, Gyeonggi-do (KR);
Chul-hwan Choi, Gyeonggi-do (KR);
Hyung-tai Kim, Gyeonggi-do (KR);
Jung-min Kim, Gyeonggi-do (KR)

(73) Assignee: LS Mtron Ltd, Gyeonggi-Do (KR)

( * ) Notice: Subject to any disclaimer, the term of this patent is extended or adjusted under 35 U.S.C. 154(b) by 512 days.

(21) Appl. No.: 11/712,903

(22) Filed: Mar. 2, 2007

(65) Prior Publication Data
US 2007/0204708 A1    Sep. 6, 2007

(30) Foreign Application Priority Data
Mar. 3, 2006    (KR)    ............ 10-2006-0020596

(51) Int. Cl.
*F16H 3/093*    (2006.01)
(52) U.S. Cl. .......................... 74/745; 74/331
(58) Field of Classification Search ............ None
See application file for complete search history.

(56) References Cited

U.S. PATENT DOCUMENTS

2002/0026853 A1*    3/2002    Matsufuji et al. ............ 74/745

* cited by examiner

*Primary Examiner*—Sherry L Estremsky
*Assistant Examiner*—Erin D Bishop
(74) *Attorney, Agent, or Firm*—McDermott Will & Emery LLP

(57) ABSTRACT

A transmission for a tractor has a forward/reverse transmission unit for selectively changing a rotational direction of power of a first shaft connected with an engine and transmitting the power to a second shaft connected with an axle shaft, a main transmission unit installed between the second shaft and the axle shaft and having a plurality of gears to speed-change the power transmitted from the second shaft in four-speed, and a sub-transmission unit installed between the main transmission unit and the axle shaft and having a plurality of gears to speed-change again the power transmitted from the main transmission unit in four-speed. The transmission realizes forward/reverse 16-speed while having a compact structure.

9 Claims, 4 Drawing Sheets

TRANSMISSION FOR TRACTOR

CROSS-REFERENCE TO RELATED APPLICATIONS

This application claims all benefits of Korean Patent Application No. 10-2006-20596 filed on Mar. 3, 2006 in the Korean Intellectual Property Office, the disclosures of which are incorporated herein by reference.

BACKGROUND OF THE INVENTION

1. Field of the invention

The present invention relates to a transmission for a tractor, and more particularly to a transmission for a tractor capable of realizing forward/reverse 16-speed while having a compact structure.

2. Description of the Prior Art

Generally, agricultural tractors are provided with a transmission, which includes a main transmission unit and a sub-transmission unit connected thereto in series. The main transmission unit serves to control forward/reverse movement and the speed change of the tractor, and the sub-transmission unit serves to further control the speed change to accelerate/decelerate after the control by the main transmission unit.

As shown in FIG. 1, a conventional tractor 10 includes at its front wheel 11 side an engine 20 the power of which is transmitted to a rear wheel 12 through a transmission 30. A working device 40 is mounted to the rear wheel 12 side so as to implement various works.

The conventional transmission for tractor is driven with tens of horsepower. It however has a problem in that since a forward/reverse clutch unit is positioned at an input shaft, a top position of the transmission, so that a driver's footboard must necessarily protrude so due to the arrangement structure, causing inconvenience in driving operation. In addition, another problem is caused in that because of very complex structure of the transmission, upon getting out of order in the transmission, it is troublesome and time-consuming to repair the transmission.

SUMMARY OF THE INVENTION

Accordingly, the present invention has been made to solve the above-mentioned problem occurring in the prior art, and an object of the present invention is to provide a transmission for a tractor capable of realizing forward/reverse 16-speed change while having a compact structure.

In order to accomplish the above object, there is provided a transmission for a tractor including a forward/reverse transmission unit for selectively changing a rotational direction of power of a first shaft connected with an engine and transmitting the power to a second shaft connected with an axle shaft, a main transmission unit installed between the second shaft and the axle shaft and having a plurality of gears to speed-change the power transmitted from the second shaft in four-speed, and a sub-transmission unit installed between the main transmission unit and the axle shaft and having a plurality of gears to speed-change again the power transmitted from the main transmission unit in four-speed.

The forward/reverse transmission unit may include a forward clutch section and a reverse clutch section both installed in parallel to the first shaft; a first gear coupled to one side of the forward clutch section to be selectively connected with the first shaft by an operation of the forward clutch section; a second gear installed on the second shaft and engaged with the first gear; a third gear coupled to one side of the reverse clutch section to be selectively connected with the first shaft by an operation of the reverse clutch section; a fourth gear engaged with the third gear; and a fifth gear installed on the second shaft and engaged with the fourth gear.

The main transmission unit may include a third shaft connected with the second shaft; a fourth shaft selectively connected with the third shaft; a fifth shaft disposed in parallel to the third and fourth shafts; a sixth gear installed on the third shaft; a seventh gear, an eighth gear, and a ninth gear installed in parallel on the fourth shaft; a tenth gear installed on the fifth shaft and engaged with the sixth gear; an eleventh gear installed on the fifth shaft and engaged with the seventh gear; a twelfth gear installed on the fifth shaft and engaged with the eighth gear; and a thirteenth gear installed on the fifth shaft and engaged with the ninth gear.

The main transmission unit may further include a first coupling gear installed on one side of the sixth gear; a second coupling gear installed on one side of the seventh gear opposite to the first coupling gear; a first hub linearly movably installed on the fourth shaft to be selectively connected with the first or second coupling gear; a third coupling gear installed on one side of the eighth gear; a fourth coupling gear installed on one side of the ninth gear opposite to the third coupling gear; and a second hub linearly movably installed on the fourth shaft to be selectively connected with the third or fourth coupling gear.

The sub-transmission unit may include a sixth shaft disposed in parallel to the fourth shaft and receiving power from the fourth shaft; a seventh shaft disposed coaxially with the fourth shaft; an eighth shaft selectively connected with the sixth shaft; a ninth shaft having one end selectively connected with the seventh shaft and the other end connected with the axle shaft; a fourteenth gear installed on distal end of the fourth shaft; an eighteenth gear installed on one end of the sixth shaft and engaged with the fourteenth gear; a nineteenth gear installed on the other end of the sixth shaft; a fifteenth gear installed on one end of the seventh shaft and engaged with the nineteenth gear; a sixteenth gear installed on the other end of the seventh shaft; a twentieth gear installed on one end of the eighth shaft and engaged with the sixteenth gear; a twenty-first gear installed on the other end of the eighth shaft; and a seventeenth gear installed on the ninth shaft and engaged with the twenty-first gear.

The sub-transmission unit may further include a fifth coupling gear installed on one side of the fourteenth gear; a sixth coupling gear installed on one side of the fifteenth gear opposite to the fifth coupling gear; a third hub linearly movably installed on the ninth shaft to be selectively connected with the fifth or sixth coupling gear; a seventh coupling gear installed on one side of the nineteenth gear; an eighth coupling gear installed on one side of the twentieth gear opposite to the seventh coupling gear; and a fourth hub linearly movably installed on the eighth shaft to be selectively connected with the seventh or sixth coupling gear.

In another embodiment of the present invention, the forward/reverse clutch sections may be installed on the second shaft.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
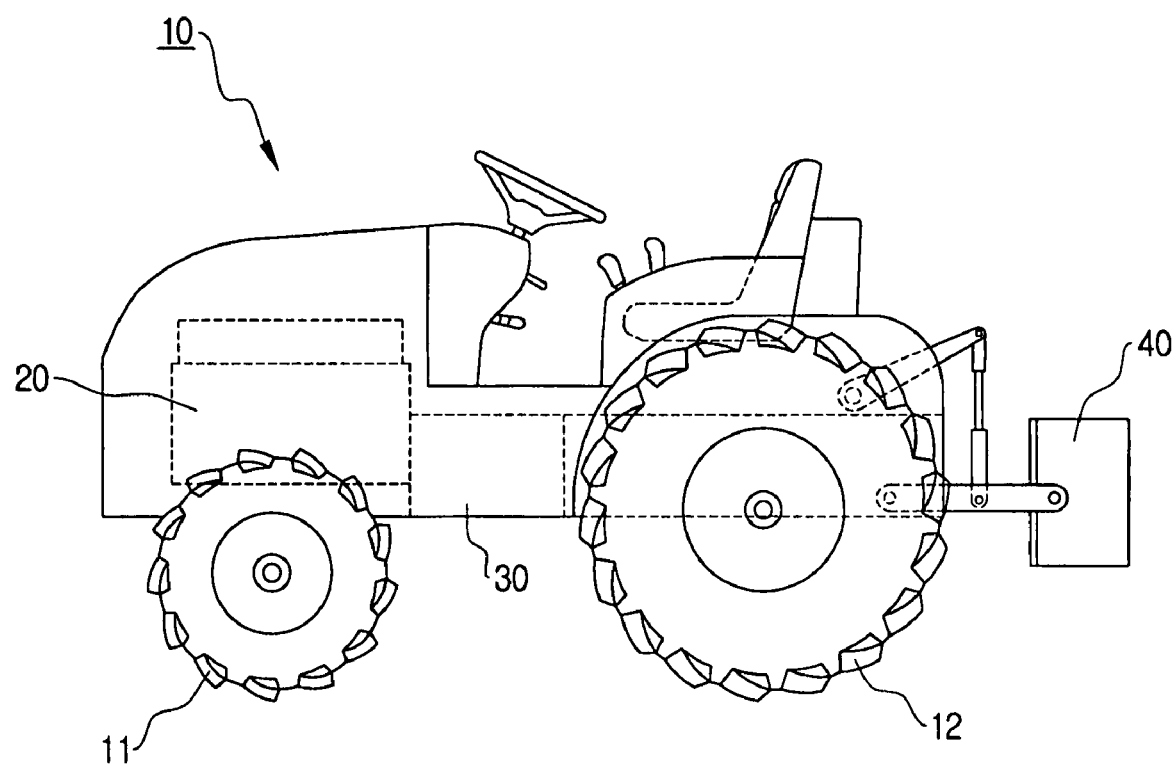
FIG. 1 is a schematic view showing a structure of a general tractor.
Figure 2:
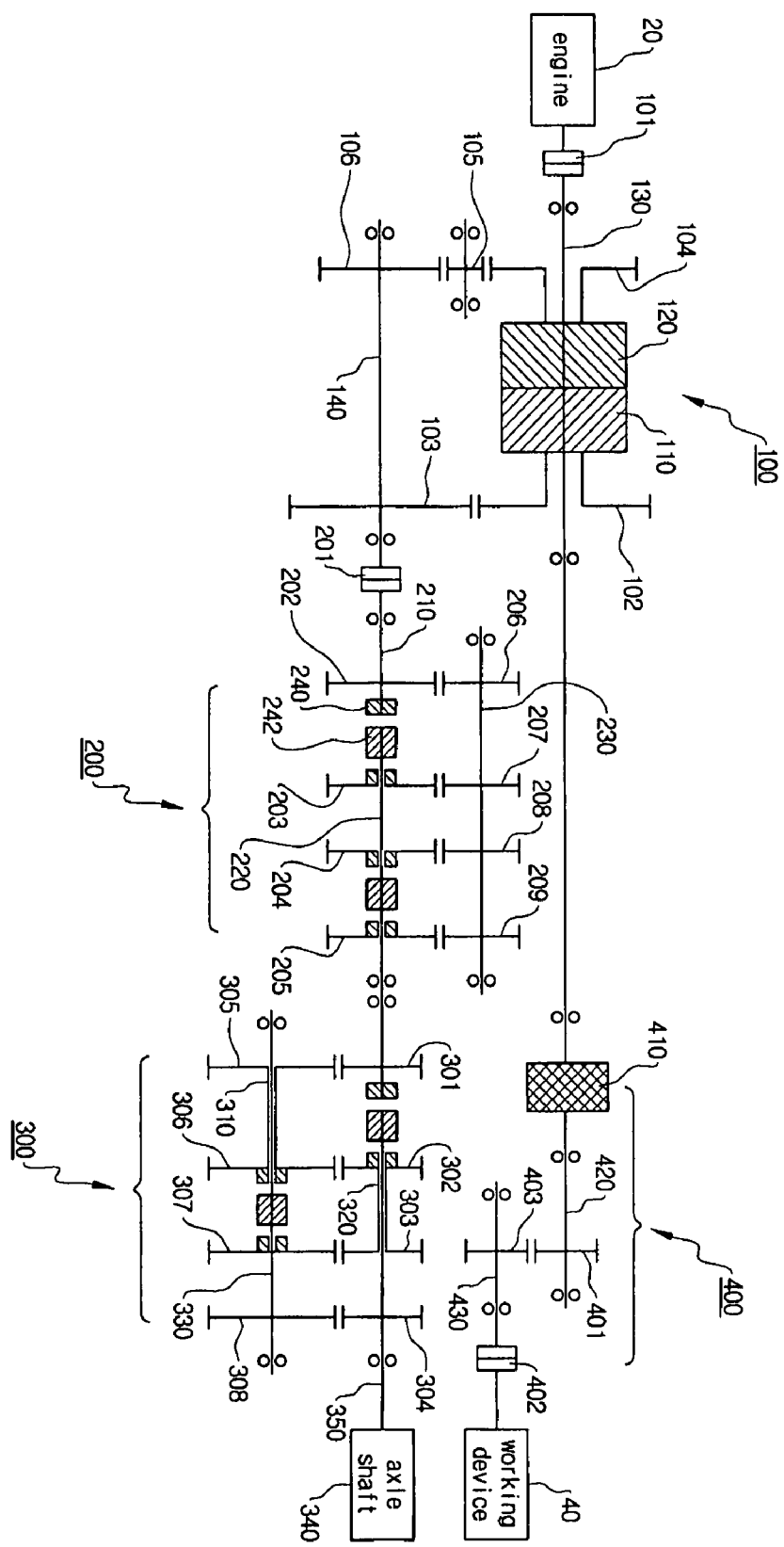
FIG. 2 is a view showing an entire structure of a transmission for a tractor according to the present invention.

As shown in FIG. 2, a transmission according to the present invention includes a forward/reverse transmission unit 100 receiving power from an engine 20 to enable a tractor to move forward or backward, a main transmission unit 200 for firstly speed-changing the power transmitted from the forward/reverse transmission unit 100, a sub-transmission unit 300 for secondarily speed-changing the power transmitted from the main transmission unit 200 and transmitting the same to a rear wheel 12 (FIG. 1), and a power take off (PTO) unit 400 connected with the engine 20 via different path from the main transmission unit 200 and the sub-transmission unit 300 to extract power of the engine 20 for use in driving a working device 40.

The forward/reverse transmission unit 100 includes a forward clutch section 110 and a reverse clutch section 120 both operated by means of hydraulic pressure. The forward/reverse clutch sections 110 and 120 are installed in parallel on a first shaft 130 connected with the engine 20 via a first coupling 101.

A first gear 102 is connected to one side of the forward clutch section 110. The forward clutch section 110 is operated by means of hydraulic pressure to selectively connect the first shaft 130 with the first gear 102. A third gear 104 is connected to one side of the reverse clutch section 120. The reverse clutch section 120 is operated by means of hydraulic pressure to selectively connect the first shaft 130 with the third gear 104.

The first gear 102 is engaged with the second gear 103, and the third gear 104 is sequentially engaged with the fourth and fifth gear 105 and 106. The second and fifth gears 103 and 106 are installed on a second shaft 140 arranged in parallel under the first shaft. The second shaft 140 is connected with an axle shaft 340 of the rear wheel of the tractor, thereby serving as an output shaft.

The power transmission from the engine 20 to the second shaft 140 is performed by two gears 102 and 103 via the forward clutch section 110 and by three gears 104, 105, and 106 via the reverse clutch section 120. Thus, the rotating direction of the second shaft 140 is opposite to each other according to the power transmission via the forward clutch section 110 and the reverse clutch section 120, which enables the forward or reverse movement of the tractor.

Although the present embodiment has been illustrated that the forward and reverse clutch sections 110 and 120 are installed on the first shaft 130 arranged parallel to the engine 20, the forward and reverse clutch sections 110 and 120 may be installed on the second shaft 140 that is an output shaft. Then, it is prevented the problem that the driver's footboard protrudes due to the installation volume of the forward and reverse clutch sections 110 and 120, thereby providing the driver with comport in operation.

The power transmitted from the engine 20 to the second shaft 140 is firstly reduced by the main transmission unit 200. The main transmission unit 200 includes a third shaft 210 connected with the second shaft 140 via a second coupling 201, a fourth shaft arranged coaxially with the third shaft 210, and a fifth shaft 230 arranged parallel to the third and fourth shafts 210 and 220. The power transmission from the third shaft 210 to the fourth shaft 220 is performed while being reduced by a plurality of gears installed on the third to fifth shafts 210, 220, and 230.

In particular, a sixth gear 202 is installed on the third shaft 210, and a seventh gear 203, an eighth gear 204, and a ninth gear 205 are installed in parallel on the fourth shaft 220. In addition, the fifth shaft 230 is provided with a tenth gear 206 engaged with the sixth gear 202, an eleventh gear 207 engaged with seventh gear 203, a twelfth gear 208 engaged with the eighth gear 204, and a thirteenth gear 209 engaged with the ninth gear 205.

Figure 3:
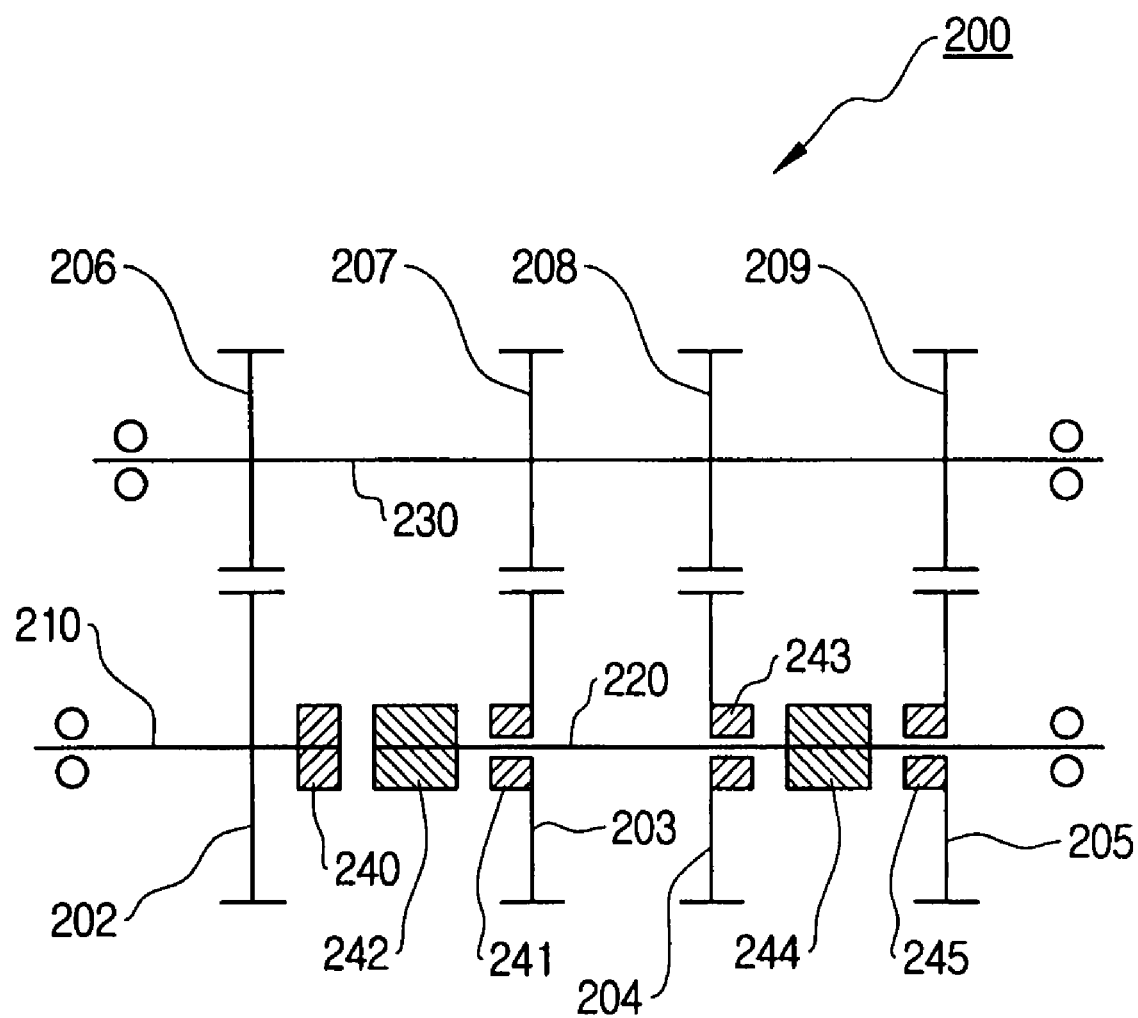
FIG. 3 is an enlarged view of a main transmission unit of the transmission for tractor of FIG. 2.

In order for the main transmission unit 200 to be speed-changed in multi-speed, as shown in FIG. 3, a first coupling gear 240 is installed on one side of the sixth gear 202, a second coupling gear 241 is installed on one side of the seventh gear 203 opposite to the first coupling gear, and a first hub 242 is linearly movably installed on the fourth shaft 220 to be selectively connected with the first or second coupling gear 240 or 241. In addition, a third coupling gear 243 is installed on one side of the eighth gear 204, a fourth coupling gear 245 is installed on one side of the ninth gear 205 opposite to the third coupling gear, and a second hub 244 is linearly movably installed on the fourth shaft 220 between the third and fourth coupling gears 243 and 245 to be selectively connected with the third or fourth coupling gear 243 or 245.

Like this, the main transmission unit 200 can be speed-changed in 4-speed by four pairs of gears 202 to 209 engaged with each other.

The power firstly reduced in the main transmission unit 200 is transmitted to the sub-transmission unit 300 via the fourth shaft 220, and is secondarily reduced again by the sub-transmission unit 300.

The sub-transmission unit 300 includes a sixth shaft 310 arranged parallel to the fourth shaft 220 to receive the power, a seventh shaft 320 arranged coaxially with the fourth shaft 220, an eighth shaft 330 extending rearward from the sixth shaft 310, and a ninth shaft 350 extending rearward from the seventh shaft 320 to be connected with the axle shaft 340 of the rear wheel. The sixth shaft 310 is comprised of a hollow shaft in which a leading end of the eighth shaft 330 is inserted. Also, the seventh shaft 320 is comprised of a hollow shaft in which a leading end of the ninth shaft 350 is inserted.

A fourteenth gear 301 is installed on a distal end of the fourth shaft 220 in order for the power transmission to the sub-transmission unit 300. An eighteenth gear 305 engaged with the fourteenth gear 301 is installed on one end of the sixth shaft 310, and a nineteenth gear 306 is installed on the other end of the sixth shaft in order for the power transmission to the seventh shaft 320. A fifteenth gear 302 engaged with the nineteenth gear 306 is installed on one end of the seventh shaft 320, and a sixteenth gear 303 is installed on the other end of the seventh shaft in order for the power transmission to the eighth shaft 330. On the eighth shaft 330, a twentieth gear 307 engaged with the sixteenth gear 303 and a twenty-first gear 308 for the power transmission to the ninth shaft 350 are installed. A seventeenth gear 304 engaged with the twenty-first gear 308 is installed on the ninth shaft 350.

Figure 4:
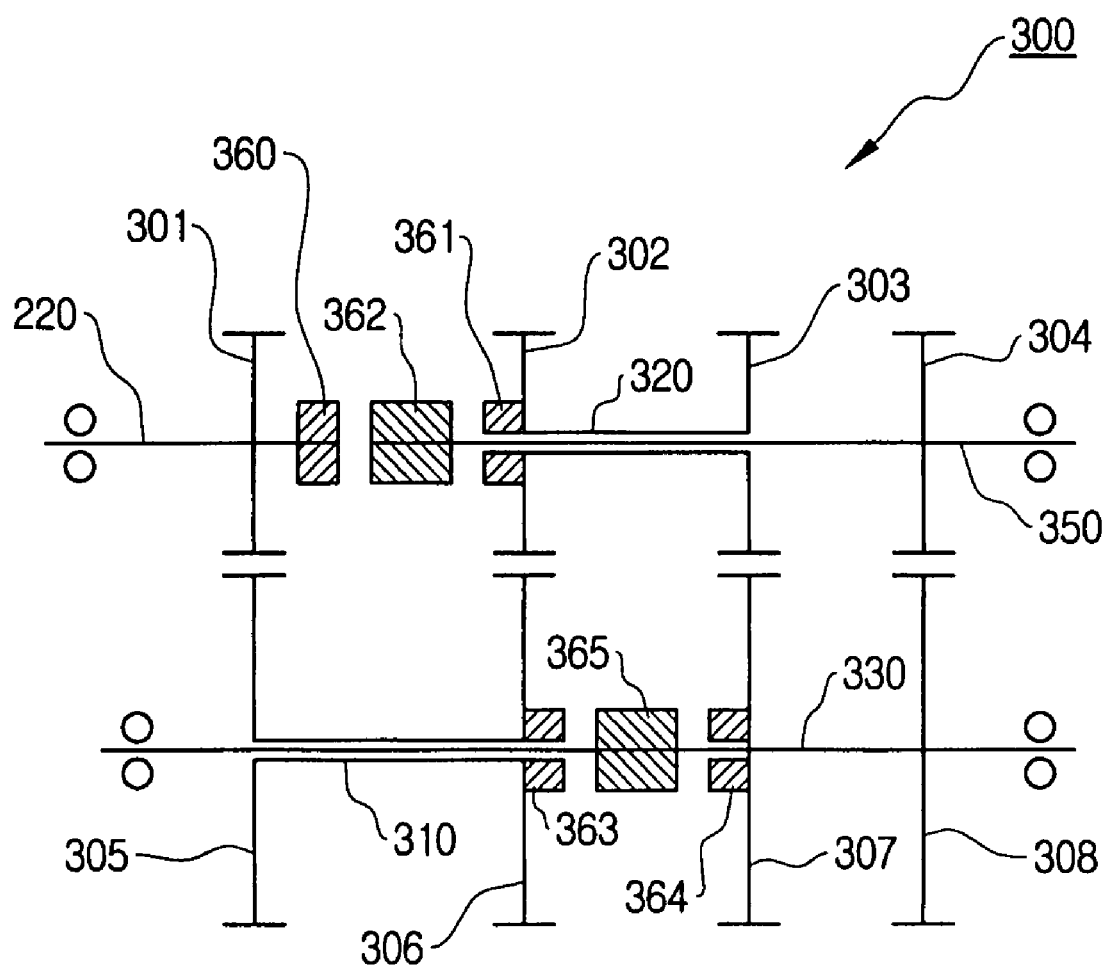
FIG. 4 is an enlarged view of a sub-transmission unit of the transmission for tractor of FIG. 2.

In order for the sub-transmission unit 300 to be speed-changed in multi-speed, as shown in FIG. 4, a fifth coupling gear 360 is installed on one side of the fourteenth gear 301, a sixth coupling gear 261 is installed on one side of the fifth gear 302 opposite to the fifth coupling gear, and a third hub 362 is linearly movably installed on the ninth shaft 350 between the fifth coupling gear 360 and the sixth coupling gear 361 to be selectively connected with the fifth or sixth coupling gear 360 or 361. In addition, a seventh coupling gear 363 is installed on one side of the nineteenth gear 306, an eighth coupling gear 364 is installed on one side of the twentieth gear 307 opposite to the seventh coupling gear, and a fourth hub 365 is linearly movably installed on the eighth shaft 330 between the seventh and eighth coupling gears 363 and 364 to be selectively connected with the seventh or eighth coupling gear 363 or 364.

Like the main transmission unit 200, the sub-transmission unit 300 can also be speed-changed in 4-speed by four pairs of gears 301 to 308 engaged with each other.

In the mean time, referring again to FIG. 2, the PTO unit 400 is connected with the engine 20 via different path from the main transmission unit 200 and the sub-transmission unit 300 to thus transmit the power of the engine 20 to the working device 40 while reducing it. The PTO unit 400 includes a tenth shaft 420 arranged coaxially with the first shaft 130 connected with the engine 20, a PTO clutch section 410 for selectively connecting the first shaft 130 and the tenth shaft 420, and an eleventh shaft 430 arranged parallel to the tenth shaft 420 to receive the power therefrom and connected with the working device 40 via a third coupling 402. The PTO clutch section 410 is operated by means of hydraulic pressure to selectively connect the first shaft 130 and the tenth shaft 420, thereby transmitting the power from the engine 20 to the working device 40. A twenty-second gear 401 is installed on the tenth shaft 420 for the power transmission to the eleventh shaft 430. A twenty-third gear 403 that is engaged with the twenty-second gear 401 is installed on the eleventh shaft 430. The power from the engine 20 is reduced and transmitted to the working device 40 by the twenty-second and twenty-third gears 401 and 403.

In the transmission as constructed above, when a driver does not do any operations while the engine 20 is in operation, only the first shaft 130 is rotated by the first coupling 101 and the power is not transmitted to the other shafts. In addition, the main transmission unit 200 performs a main transmission function to determine a driving speed of the tractor, and the sub-transmission unit 300 extends the range of the speed change because a required speed cannot be obtained by only 4-speed change by the main transmission unit 200. The PTO unit 400 extracts the power outside of the tractor, thereby enabling various kind of working.

Description will now be made to an operation of speed change by the transmission of the present invention.

[Forward Movement Operation]

When hydraulic pressure is introduced into the forward clutch section 110 from a hydraulic pressure source (not shown) according to a driver's operation, the first shaft 130 and the first gear 102 are connected with each other so that the first gear 102 is rotated with the rotation of the first shaft 130. The rotation of the first gear 102 makes the second gear connected therewith and the third shaft 210 rotated so that the power of the engine 20 is transmitted to the main transmission unit 200.

[Reverse Movement Operation]

When hydraulic pressure is introduced into the reverse clutch section 120 from a hydraulic pressure source according to a driver's operation, the first shaft 130 and the third gear 104 are connected with each other so that the third gear 104 is rotated. The rotation of the third gear 104 makes the fourth gear 105 connected therewith, the fifth gear 106, and the second shaft 140 rotated sequentially. Herein, the power is transmitted to the main transmission unit 200 in a reverse rotating direction to that of the forward movement operation.

[First-Speed Operation in Main Speed Change]

When a driver conducts a first-speed operation of the main speed change, the first hub 242 moves to the right in FIG. 3 to be connected with the second coupling gear 241. At this time, the power from the engine 20 is transmitted to the third shaft 210 via the first shaft 130, the forward clutch section 110, the first gear 102, the second gear 103, and the second shaft 140, sequentially. Then, the power of the third shaft 210 is reduced while being transmitted to the sixth gear 202, the tenth gear 206, the eleventh gear 207, and the seventh gear 203, sequentially. Moreover, since the seventh gear 203 and the fourth shaft 220 are connected with each other by the second coupling gear 241 and the first hub 242, the power is transmitted from the seventh gear 203 to the sub-transmission unit 300 via the fourth shaft 220.

[Second-Speed Operation in Main Speed Change]

When a driver conducts a second-speed operation of the main speed change, the first hub 242 moves to the left in FIG. 3 to be connected with the first coupling gear 240. Thus, the power transmitted from the engine 20 to the third shaft 210 is directly transmitted to the fourth shaft 220 via the first coupling gear 240 and the first hub 242.

[Third-Speed Operation in Main Speed Change]

When a driver conducts a third-speed operation of the main speed change, the second hub 244 moves to the right in FIG. 3 to be connected with the fourth coupling gear 245. At this time, the power from the engine 20 is reduced while being transmitted to the third shaft 210, the sixth gear 202, the tenth gear 206, the fifth shaft 230, the thirteenth gear 209, and the ninth gear 205, sequentially. Moreover, since the ninth gear 205 and the fourth shaft 220 are connected with each other by the fourth coupling gear 245 and the second hub 244, the power is transmitted from the ninth gear 205 to the sub-transmission unit 300 via the fourth shaft 220.

[Fourth-Speed Operation in Main Speed Change]

When a driver conducts a fourth-speed operation of the main speed change, the second hub 244 moves to the left in FIG. 3 to be connected with the third coupling gear 243. At this time, the power from the engine 20 is reduced while being transmitted to the third shaft 210, the sixth gear 202, the tenth gear 206, the fifth shaft 230, the twelfth gear 208, and the eighth gear 204, sequentially. Moreover, since the eighth gear 204 and the fourth shaft 220 are connected with each other by the third coupling gear 243 and the second hub 244, the power is transmitted from the eighth gear 204 to the sub-transmission unit 300 via the fourth shaft 220.

[First-Speed Operation in Sub Speed Change]

When a driver conducts a first-speed operation of the sub speed change, the fourth hub 365 moves to the right in FIG. 4 to be connected with the eighth coupling gear 364. At this time, the power from the main transmission unit 200 is reduced while being transmitted to the fourth shaft 220, the fourteenth gear 301, the eighteenth gear 305, the sixth shaft 310, the nineteenth gear 306, the fifteenth gear 302, the sixteenth gear 303, and the twentieth gear 307, sequentially. Moreover, since the twentieth gear 307 and the eighth shaft 330 are connected with each other by the eighth coupling gear 364 and the fourth hub 365, the power is transmitted to the axle shaft 340 via the eighth shaft 330, the twenty-first gear 308, the seventeenth gear 304, and the ninth shaft 350.

[Second-Speed Operation in Sub Speed Change]

When a driver conducts a second-speed operation of the sub speed change, the third hub 362 moves to the right in FIG. 4 to be connected with the sixth coupling gear 361. At this time, the power from the main transmission unit 200 is reduced while being transmitted to the fourth shaft 220, the fourteenth gear 301, the eighteenth gear 305, the sixth shaft 310, the nineteenth gear 306, and the fifteenth gear 302, sequentially. Moreover, since the fifteenth gear 302 and the ninth shaft 350 are connected with each other by the sixth coupling gear 361 and the third hub 362, the power is transmitted to the axle shaft 340 via the ninth shaft 350.

[Third-Speed Operation in Sub Speed Change]

When a driver conducts a third-speed operation of the sub speed change, the fourth hub 365 moves to the left in FIG. 4 to be connected with the seventh coupling gear 363. At this time, the power from the main transmission unit 200 is reduced while being transmitted to the fourth shaft 220, the fourteenth gear 301, the eighteenth gear 305, and the sixth shaft 310, sequentially. Moreover, since the sixth shaft 310 and the eighth shaft 330 are connected with each other by the seventh coupling gear 363 and the fourth hub 365, the power of the sixth shaft 310 is transmitted to the axle shaft 340 via the eighth shaft 330, the twenty-first gear 308, the seventeenth gear 304, and the ninth shaft 350.

[Fourth-Speed Operation in Sub Speed Change]

When a driver conducts a fourth-speed operation of the sub speed change, the third hub 362 moves to the left in FIG. 4 to be connected with the fifth coupling gear 360. Since the fourth shaft 220 and the ninth shaft 350 thus are connected with each other, the power from the main transmission unit 200 is transmitted directly to the axle shaft 340 via the fourth shaft 220 and the ninth shaft 350.

[Operation of PTO Unit]

When the hydraulic fluid is introduced from the hydraulic pressure source into the PTO clutch section 410 according to a driver's operation, the first shaft 130 and the tenth shaft 420 are connected with each other. Thus, the power of engine 20 is reduced via the twenty-second gear 401 and the twenty-third gear 403 and transmitted to the eleventh shaft 430 and finally to the working device 40 connected by the eleventh shaft 430 and the third coupling 402.

From the foregoing, the transmission for tractor according to the present invention can perform total 16-speed by the combination of 4-speed in the main transmission unit and 4-speed in the sub transmission unit. In addition, by the forward/reverse transmission unit 100, the speed change by 16-speed forward movement and 16-speed reverse movement is possible.

As set forth before, according to the present invention, a transmission for tractor can be provided which realizes the speed change of 16-speed forward/reverse movement while having a compact structure. In addition, as compared to the prior art, the present invention has an advantage of having improved productivity because of reduced number of parts of the transmission.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A transmission for a tractor comprising:
    a forward/reverse transmission unit for selectively changing a rotational direction of power of a first shaft connected with an engine and transmitting the power to a second shaft connected with an axle shaft;
    a main transmission unit installed between the second shaft and the axle shaft and having a plurality of gears to speed-change the power transmitted from the second shaft in four-speed; and
    a sub-transmission unit installed between the main transmission unit and the axle shaft and having a plurality of gears to speed-change again the power transmitted from the main transmission unit in four-speed,
    wherein the main transmission unit includes:
        a third shaft connected with the second shaft;
        a fourth shaft selectively connected with the third shaft;
        a fifth shaft arranged parallel to the third and fourth shafts;
        a sixth gear installed on the third shaft;
        a seventh gear, an eighth gear and a ninth gear installed in parallel on the fourth shaft;
        a tenth gear installed on the fifth shaft and engaged with the sixth gear;
        an eleventh gear installed on the fifth shaft and engaged with the seventh gear;
        a twelfth gear installed on the fifth shaft and engaged with the eighth gear;
        a thirteenth gear installed on the fifth shaft and engaged with the ninth gear;
        a first coupling gear installed on one side of the sixth gear;
        a second coupling gear installed on one side of the seventh gear opposite to the first coupling gear;
        a first hub linearly movably installed on the fourth shaft to be selectively connected with the first or second coupling gear;
        a third coupling gear installed on one side of the eighth gear;
        a fourth coupling gear installed on one side of the ninth gear opposite to the third coupling gear; and
        a second hub linearly movably installed on the fourth shaft to be selectively connected with the third or fourth coupling gear.

2. The transmission as claimed in claim 1, wherein the forward/reverse transmission unit includes:
    a forward clutch section and a reverse clutch section both installed in parallel on the first shaft;
    a first gear coupled to one side of the forward clutch section to be selectively connected with the first shaft by an operation of the forward clutch section;
    a second gear installed on the second shaft and engaged with the first gear;
    a third gear coupled to one side of (the reverse clutch section to be selectively connected with the first shaft by an operation of the reverse clutch section;
    a fourth gear engaged with the third gear; and
    a fifth gear installed on the second shaft and engaged with the fourth gear.

3. The transmission as claimed in claim 2, wherein the forward/reverse clutch sections are installed on the second shaft.

4. The transmission as claimed in claim 1, wherein the sub-transmission unit includes:
    a sixth shaft arranged parallel to the fourth shaft and receiving power from the fourth shaft;
    a seventh shaft arranged coaxially with the fourth shaft;
    an eighth shaft selectively connected with the sixth shaft;
    a ninth shaft having one end selectively connected with the seventh shaft and the other end connected with the axle shaft;

a fourteenth gear installed on a distal end of the fourth shaft;
an eighteenth gear installed on one end of the sixth shaft and engaged with the fourteenth gear;
a nineteenth gear installed on the other end of the sixth shaft;
a fifteenth gear installed on one end of the seventh shaft and engaged with the nineteenth gear;
a sixteenth gear installed on the other end of the seventh shaft;
a twentieth gear installed on one end of the eighth shaft and engaged with the sixteenth gear;
a twenty-first gear installed on the other end of the eighth shaft; and
a seventeenth gear installed on the ninth shaft and engaged with the twenty-first gear.

5. The transmission as claimed in claim 4, wherein the sub-transmission unit further includes:
a fifth coupling gear installed an one side of the fourteenth gear;
a sixth coupling gear installed on one side of the fifteenth gear opposite to the fifth coupling gear;
a third hub linearly movably installed on the ninth shaft to be selectively connected with the fifth or sixth coupling gear;
a seventh coupling gear installed on one side of the nineteenth gear;
an eighth coupling gear installed on one side of the twentieth gear opposite to the seventh coupling gear; and
a fourth hub linearly movably installed on the eighth shaft to be selectively connected with the seventh or sixth coupling gear.

6. A transmission for a tractor comprising:
a forward/reverse transmission unit for selectively changing a rotational direction of power of a first shaft connected with an engine and transmitting the power to a second shaft connected with an axle shaft;
a main transmission unit installed between the second shaft and the axle shaft and having a plurality of gears to speed-change the power transmitted from the second shaft in four-speed; and
a sub-transmission unit installed between the main transmission unit and the axle shaft and having a plurality of gears to speed-change again the power transmitted from the main transmission unit in four-speed,
wherein the main transmission unit includes:
a third shaft connected with the second shaft;
a fourth shaft selectively connected with the third shaft;
a fifth shaft arranged parallel to the third and fourth shafts;
a sixth gear installed on the third shaft;
a seventh gear, an eighth gear, and a ninth gear installed in parallel on the fourth shaft;
a tenth gear installed on the fifth shaft and engaged with the sixth gear;
an eleventh gear installed on the fifth shaft and engaged with the seventh gear;
a twelfth gear installed on the fifth shaft and engaged with the eight gear; and
a thirteenth gear installed on the fifth shaft and engaged with the ninth gear; and wherein the sub-transmission unit includes:
a sixth shaft arranged parallel to the fourth shaft and receiving power from the fourth shaft;
a seventh shaft ranged coaxially with the fourth shaft;
an eighth shaft selectively connected with the sixth shaft;
a ninth shaft having one end selectively connected with the seventh shaft and the other end connected with the axle shaft;
a fourteenth gear installed on a distal end of the fourth shaft;
an eighteenth gear installed on one end of the sixth shaft and engaged with the fourteenth gear;
a nineteenth gear installed on the other end of the sixth shaft;
a fifteenth gear installed on one end of the seventh shaft and engaged with the nineteenth gear;
a sixteenth gear installed on the other end of the seventh shaft;
a twentieth gear installed on one end of the eighth shaft and engaged with the sixteenth gear;
a twenty-first gear installed on the other end of the eighth shaft; and
a seventeenth gear installed on the ninth shaft and engaged with the twenty-first gear.

7. The transmission as claimed in claim 6, wherein the forward/reverse transmission unit includes;
a forward clutch section and a reverse clutch section both installed in parallel on the first shaft;
a first gear coupled to one side of the forward clutch section to be selectively connected with the first shaft by an operation of the forward clutch section;
a second gear installed on the second shaft and engaged with the first gear;
a third gear coupled to one side of the reverse clutch section to be selectively connected with the first shaft by an operation of the reverse clutch section,
a fourth gear engaged with the third gear; and
a fifth gear installed on the second shaft and engaged with the fourth gear.

8. The transmission as claimed in claim 6, wherein the sub-transmission unit further includes:
a fifth coupling gear installed on one side of the fourteenth gear;
a sixth coupling gear installed on one side of the fifteenth gear opposite to the fifth coupling gear;
a third hub linearly movably installed on the ninth shaft to be selectively connected with the fifth or sixth coupling gear;
a seventh coupling gear installed on one side of the nineteenth gear;
an eighth coupling gear installed on one side of the twentieth gear opposite to the seventh coupling gear; and
a fourth hub linearly movably installed on the eighth shaft to be selectively connected with the seventh or sixth coupling gear.

9. The transmission as claimed in claim 7, wherein the forward/reverse clutch sections are installed on the second shaft.

* * * * *